April 16, 1946.  H. E. MESSMORE  2,398,546
THERMAL INSULATION OF VESSELS
Filed Nov. 6, 1944
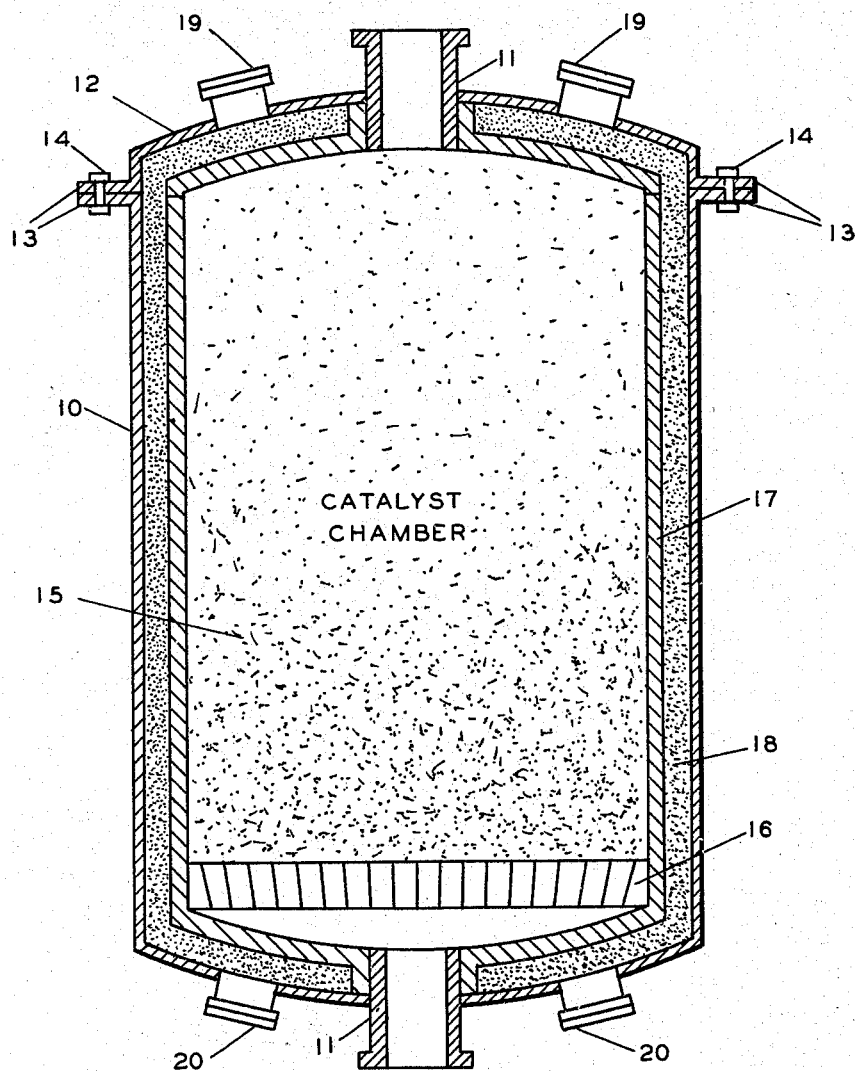
INVENTOR
H.E. MESSMORE
BY Hudson & Young
ATTORNEYS Patented Apr. 16, 1946

2,398,546

UNITED STATES PATENT OFFICE 2,398,546

THERMAL INSULATION OF VESSELS

Harold E. Messmore, Bartlesville, Okla., assignor to Phillips Petroleum Company, a corporation of Delaware Application November 6, 1944, Serial No. 562,221

6 Claims. (Cl. 23—288)

This invention relates to the thermal insulation of vessels and more particularly to improvements in the internal insulation of vessels in which the insulation is subject to formation of cracks therein during operation. In a particular aspect of the present invention it relates to apparatus in which the conversion of hydrocarbons is carried out.

Thermal insulation of vessels is conventionally obtained by applying an insulating cement or a resinous substance which solidifies and adheres to the surface of the vessel to be insulated, or by providing a preformed "liner" of similar or different material than the vessel to form an inner shell or outer casing. In using a metallic "liner," a space of varying depth, depending upon specific conditions, is established and may be filled with insulating material, if desired.

Such insulation is frequently used for the double purpose of minimizing heat losses and protecting the chamber walls of vessels employed in thermal conversion processes. In catalytic hydrocarbon conversions, for example, the catalyst becomes deactivated by a deposit of carbon and temperatures in the range of 1000° F. to 1500° F. are required to burn off the carbon and regenerate the catalyst. At such temperatures the chamber walls of the vessel deteriorate rapidly and consequently require the protection of heat-resisting insulation to prevent the walls from being subjected to temperatures approaching those employed in the catalyst regenerations. Also, in those conversion processes which involve endothermic reactions, the use of insulation to prevent heat losses is desirable in order to maintain an efficient rate of conversion. Thus it has become desirable and convenient to insulate the interior of the usual metal chamber with an insulating material, preferably of the refractory type. With such material it has become possible to use chambers of relatively inexpensive materials, such as carbon steel, instead of more expensive special metal alloys and still avoid the detrimental effects of high temperature. Furthermore, the insulation retards heat losses during conversion.

A common source of trouble, however, in the use of internally insulated chambers is the cracking of the insulation and channeling of fluids therethrough. This undesirable cracking may be caused by unequal heating and/or cooling during operation and is particularly likely to occur in regions around points of attachment of various pieces of structure, such as at connections fastening supports for screens in the case of catalyst beds or in other areas where a continuous solid surface of insulation is interrupted or disturbed. The tendency to crack and channel is especially prevalent in insulated catalyst chambers containing a bed or beds of catalyst since the catalyst presents a hindrance to the flow of fluid which may seek a path of less resistance through cracks which by-pass the catalyst bed. Such an eventuality results in unsatisfactory operation, heat losses through the chamber, and incomplete conversion of the process material. The development of these cracks in a chamber liner may permit "hot spots" to form on the chamber shell, especially during regeneration, with the consequent deterioration of the shell. Where a crack is formed it may be widened and lengthened and the insulation loosened from the walls of the chamber by fluids passing through the cracks and between the chamber wall and the insulation or by the contraction and expansion incident to heating and cooling of the chamber, such as may occur between regeneration and conversion steps in catalytic hydrocarbon conversion processes or between reaction and shutdown periods for the chamber. Due to the usual difference in coefficients of expansion between the metallic shell of the vessel and the insulating liner, the tendency of the insulation to become loosened from the chamber wall is increased, even though the shell may not become as hot as the insulation. The formation of fluid-tight insulation liners is further complicated by the tendency of the insulating materials, such as refractory cements, to shrink on setting after being cast in the form of a plastic mass. With preformed refractory blocks or sections cemented at the joints, crumbling of the refractory cement used, and rupture of the joint seal frequently occurs due to the strain caused by unequal heating and cooling and the difference in coefficients of expansion between the sealing cement and the block or refractory section and further due to the above-mentioned tendency of refractory cements to shrink. Experience has shown that with present-day methods of insulation and insulating materials the insulation tends to crack and permit undesirable escape of fluids from the conversion zone. In particular, when conducting reactions utilizing solid catalytic material disposed in the catalyst chamber in the form of beds or otherwise, a substantial pressure drop exists between fluid inlet and outlet, and flow through cracks in the insulating liner, and then between the liner and the shell, may occur since this would represent a path of least resistance. Even where there is no substantial resistance to flow in the chamber, after long periods of operation and the successive fluctuations in temperature which occur in reaction and regeneration cycles etc., formation of cracks and separation of lining from the shell, may cause by-passing of portions of the catalyst mass by portions of the material being reacted. The present invention is, therefore, particularly applicable to the catalytic cracking of hydrocarbons, as for example, cracking of gas oils or naphthas at temperatures of 850-1150° F. over bauxite, silica-alumina, or acid-treated clay catalysts.

Various attempts to prevent the formation and/or compensate for the presence of undesirable cracks in the insulation protecting metallic vessel walls have been proposed. Thus, two or more layers of insulation between which liquids are flowed have been provided, the function of the liquid being to neutralize, dilute and/or carry off any corrosive material which might escape through cracks in the insulation. Other methods provide for the passage of one of the non-corrosive liquid reactants in a space between a reaction zone and the shell wall or for the introduction of a gaseous reactant into such a space and through a porous protective liner into a reaction zone. Still others provide an intermediate space which is filled with a viscous rubber-like material or, in some cases, sheets of a heat-insulating material, such as asbestos. From the standpoint of economical considerations and operational difficulties, in general, methods of the prior art have not proven entirely satisfactory. Additional equipment and circulation systems, inadequate protection and insulation, introduction of contaminating foreign matter into the reaction zone through the cracks, and other undesirable factors have been encountered in the practice of insulation of vessels and chambers.

It is, therefore, an object of this invention to describe an improvement in the insulation of vessels with refractory material.

Another object is to prevent the escape of corrosive fluids from a restricted zone by means of a novel method of insulation.

A further object of the invention is to insulate the inner shell wall of a vessel and provide for the confinement of fluids to the interior portion of the vessel.

Another object of the present invention is to describe a catalyst chamber having a novel type of thermal insulation in which injury to liner and outer wall of the chamber due to cracking of insulation and by-passing of fluid reactants, will be minimized.

These and other objects will be apparent from the appended drawing and description which follows.

In general, the present invention is carried out by lining a vessel with some conventional refractory material such as is commonly used, except that a space is provided between the refractory liner and the outer wall or shell of the vessel. Into this space is introduced granular or finely divided material, preferably of a refractory or heat insulating character. In the event of formation of cracks in the lining the granular and finely divided material tends to seep into or plug the crack and provides resistance to flow of fluids therethrough. Even where the pressure of fluids within the vessel is so great that substantial filling of the cracks will be prevented, the finely divided material in the space will offer substantial resistance to flow of fluids into and through the space. This is particularly true when a catalyst mass is disposed within the vessel, in which case the filling material is preferably selected to be of a particle size smaller than the catalyst so that the pressure drop through this material would be greater than that through the catalyst. Thus any substantial flow or by-passing of reactant through the space between liner and shell would be prevented as the fluid would tend to flow through the catalyst mass as offering a path of least resistance. The mass of filling material, in addition to preventing or retarding flow of gases through the space between shell and liner, also serves to furnish continuous mechanical support for the liner and to provide additional thermal insulation. In this way contact between the rigid liner and the metal shell is eliminated, thus avoiding direct contact of the liner, which is at a high temperature, with the shell which is in contact with the atmosphere. In this way the temperature differential transversely through the body of the liner is not as great, and the consequent expansion and contraction due to temperature change is substantially less. The granular filler constitutes a more or less resilient mass able to expand and contract and this is able to serve as an insulating medium while at the same time serving as a support for the liner. In general, a granular material as a filler is advantageous since it forms a multipoint support for the liner while at the same time serving to cushion expansion and contraction of shell and liner due to the presence of voids in the space occupied by the said granular material.

The application of the invention may be described in connection with the insulation of a vessel as shown in the appended drawing which is an elevational view of a catalyst chamber embodying the improvements of this invention. Numerous other modes of applying the principles of this invention will be apparent from the present disclosure.

In the drawing, the numeral 10 represents the shell of a catalyst chamber, having inlet and outlet openings 11 and a cover 12. In operation the cover is secured to the shell by flanges 13 and bolts 14. The catalyst 15 may be arranged in a continuous bed or in several layers and supported on perforated plates or catalyst retention screens 16. The vessel is provided with an inner liner 17 of insulation, preferably of the refractory type so constructed to provide an annular space between the liner and shell wall. This space is filled with a mixture of powdered and/or granular solid, non-fusible filling material 18. Capped inlets 19 at the top of the chamber and outlets 20 at the bottom of the chamber permit the introduction of additional filling material and removal of the filler as desired.

The construction of the chamber is not limited to the type illustrated and described but may be of any design suitable for the practice of this invention and the process in which it is to be used, as will be apparent to one skilled in the art. Similarly, changes in apparatus may be made, for instance, in the provision for and/or the number of inlets and outlets for filling material as represented at 19 and 20. An inlet to the space at the top of the chamber is advantageous in allowing the addition, without removal of the cover, of more filling material as it settles or filters into cracks during operation.

The inclusion of a substantial proportion of fine, powdery material in the mixture of filler may be desirable to ensure some closure and stoppage of the cracks, since a mixture of powdery and coarser material presents a constantly flowable substance of matter which, readily filters into the cracks and fills the void left by material entering said cracks. Powdery material alone may be used but may tend to pack and permit channeling of fluids therethrough. Granular material alone may be suitable provided it is of sufficient dimensions to obstruct the flow of fluids which may get through cracks. A convenient size of material may be for example within the range of 4-200 mesh. Material, when crushed and screened on such screens, contains some of all sizes finer than the sieve used. The ratio of granular to powdery material may be adjusted if desired by the addition of either size material. Suitable filling material may be crushed and powdered solid insulating materials, such as ceramic matter, firebrick, cement, silica or magnesia blocks or other refractory material. Pelleted powdered materials may also be used. Such materials when used serve the double purpose of further insulation and filler as described above. Where the vessel insulated is employed as a catalyst chamber, it may be particularly desirable to use some of the catalyst itself, properly ground or granulated as the filler. In this case, any of the filler which should filter into the catalyst chamber would not be foreign to the body of catalyst. Bauxite, fuller's earth, natural clay, or other non-fusible material may also be satisfactory.

The pressure under which reactions and conversions are usually conducted within the reaction chamber does not impose any restrictions on the application of this invention in insulating the walls of the vessel. Even with a substantially high pressure within the vessel and acting to force the fluid through a crack, some of the filler will still filter into the crack during operation and as it does so the body of filler in the space above the crack will settle and retain it within the crack. Where a mixture of coarser and finer particles is used, the larger particles form a framework about which the finer particles fill in. The process of sealing continues until the crack is closed and the fluid is confined to the restricted zone. The presence of the solid material between the insulation and shell wall counteracts any tendency of the insulation to buckle or rupture from internal pressure during operations. The practice of the invention does not require a circulation system, added equipment, or careful control and special attention to the installations. Additional filler may be added as required and any or all of the filler may be removed through the ports as described. Such addition or removal and refilling, may be required from time to time in case the filling material should settle or become packed.

The manner of installing the insulation lining has not been described since pre-cast moldings, refractory blocks, monolithic construction in situ, or other methods of lining a vessel may be used with the provision of the filling space between the wall of insulation and the shell wall of the vessel. This space may conveniently be one-half inch to four inches or more in width. Although the example above was described in connection with a vertical catalyst chamber, the invention is applicable to any type of vessel which it is desirable to insulate. The vessel may be horizontal or in other desired positions and it may be necessary to provide supports, such as cleats attached to the shell wall and supporting the insulation liner on the under side, to prevent the liner from resting against the shell wall and thereby destroying a portion of the annular space. With a horizontal vessel it is more advantageous to have the filler inlets and outlets on the top and lower sides of the vessel, respectively, rather than at the ends. The insulation itself may be any of the well known refractory materials designed for such purposes, such as Insulag, Insulcrete, Firecrete, firebrick and others.

Various other changes and modifications may be made without departing from the spirit of the invention as defined by the following claims.

I claim:

1. Apparatus for the thermal treatment of fluids which comprises a vessel having an outer metallic shell forming an enclosed chamber, a lining for said chamber composed of solid refractory material and spaced from said shell, said liner and shell defining a space therebetween substantially coextensive therewith, means for introducing fluids to be treated into and removing treated fluids from the interior of the vessel as defined by the lining, means for substantially preventing the flow of fluids through cracks which form in said lining comprising mobile particulate refractory material substantially filling said space and having a particle size sufficiently small to offer substantial resistance to flow of said fluids and means communicating with said space for introducing and removing said particulate material.

2. An apparatus according to claim 1 in which said particulate refractory material comprises a mixture of granular and powdery material between 4-200 mesh in size.

3. Apparatus for the catalytic conversion of fluids which comprises a catalyst chamber having an outer shell, a refractory heat insulating lining coextensive therewith but spaced therefrom defining a region substantially coextensive with said shell, solid catalytic material disposed within the interior of the chamber and surrounded by said lining, means for flowing fluids to be converted through said chamber in contact with said catalyst mass, means for removing converted products from said chamber, and means for substantially preventing flow of fluids through cracks which may form in said lining comprising mobile particulate refractory heat insulating material filling the space defined between said lining and said shell, said particulate material having a particle size sufficient to substantially impede flow of fluids in said space by shifting to pack closely and substantially to seal said cracks.

4. Apparatus according to claim 3 in which the catalyst mass comprises a bed of granular catalytic material, and wherein the mobile particulate heat insulating material has a particle size smaller than that of the catalyst whereby the pressure drop through a unit portion of said catalyst bed is less than that through a corresponding portion of said particulate material.

5. Apparatus according to claim 3 in which the mobile particulate material comprises solid catalytic material of finer particle size than the particles of said catalytic mass.

6. An apparatus for cracking hydrocarbons in the presence of solid contact material which comprises a catalyst chamber having an outer shell, a refractory heat insulating lining spaced therefrom, said lining and said shell defining a space therebetween substantially coextensive therewith, solid cracking catalyst disposed within said lining, means for introducing fluids into said chamber in contact with said catalyst, means for removing converted products from said chamber, and mobile granular material disposed within the space defined by said lining and said chamber serving to support said lining and resist the passage of fluids therethrough.

HAROLD E. MESSMORE.